United States Patent
Sheikh (10) Patent No.: US 9,232,777 B2
(45) Date of Patent: *Jan. 12, 2016

(54) FISHING LURE

(71) Applicant: Kamooki Lures Ltd., Sherwood Park (CA)

(72) Inventor: Kamran Nazar Sheikh, Sherwood Park (CA)

(73) Assignee: KAMOOKI LURES LTD., Sherwood Park, AB (CA)

( * ) Notice: Subject to any disclaimer, the term of this patent is extended or adjusted under 35 U.S.C. 154(b) by 299 days.

This patent is subject to a terminal disclaimer.

(21) Appl. No.: 13/940,433

(22) Filed: Jul. 12, 2013

(65) Prior Publication Data

US 2013/0298442 A1 Nov. 14, 2013

Related U.S. Application Data

(63) Continuation-in-part of application No. 13/048,499, filed on Mar. 15, 2011, now Pat. No. 8,484,885.

(30) Foreign Application Priority Data

Mar. 17, 2010 (CA) .................................... 2697064

(51) Int. Cl.
*A01K 85/00* (2006.01)
*A01K 85/16* (2006.01)

(52) U.S. Cl.
CPC ................ *A01K 85/00* (2013.01); *A01K 85/16* (2013.01)

(58) Field of Classification Search
USPC ........................................ 43/42.39, 42.22, 42
See application file for complete search history.

(56) References Cited

U.S. PATENT DOCUMENTS

| | | | |
|---|---|---|---|
| 3,753,310 | A | 8/1973 | Werner |
| 4,653,212 | A | 3/1987 | Pixton |
| 4,713,907 | A | 12/1987 | Dudeck |
| 5,396,728 | A | 3/1995 | Weber et al. |
| 5,490,347 | A | 2/1996 | Conley |
| 5,535,540 | A | 7/1996 | Crumrine |
| 5,822,912 | A | 10/1998 | Kato et al. |
| 6,035,574 | A | 3/2000 | Ware |
| 6,581,320 | B1 | 6/2003 | Hnizdor |
| 7,415,793 | B1 | 8/2008 | Borchardt |
| 7,743,550 | B2 | 6/2010 | Huddleston |
| 7,748,157 | B1 | 7/2010 | Hellmann |
| 7,827,731 | B2 | 11/2010 | Gibson |
| 2005/0204607 | A1 | 9/2005 | Nichols |
| 2011/0214333 | A1 | 9/2011 | Travieso |

*Primary Examiner* — Christopher P Ellis
(74) *Attorney, Agent, or Firm* — Welsh Flaxman & Gitler LLC (57) ABSTRACT

A fishing lure is provided which is adapted to simulate the behavior of a minnow at rest. Specifically, the new and improved fishing lure described herein is equipped with a pedestal on its bottom, whereby the pedestal is adapted to make contact with a bottom surface at a single contact point. The single contact point is aligned with the lure's center of balance, such that when the lure rests on the bottom surface it has a tendency to remain balanced on the single contact point. This allows the lure to be wobbled by the water turbulence, thereby imitating the behavior of a minnow at rest.

16 Claims, 10 Drawing Sheets

FISHING LURE

This application is a continuation-in-part of U.S. patent application Ser. No. 13/048,499 entitled "Fishing Lure", filed Mar. 15, 2011, which is currently pending.

FIELD OF THE INVENTION

The present invention relates to fishing lures. In particular, the present invention relates to fishing lures adapted to simulate the behavior of bait fish such as a minnow.

BACKGROUND OF THE INVENTION

It is well known that it is desirable to use artificial baits when fishing. It is also well known that such artificial baits are more efficient the more they resemble the actual live bait they are meant to imitate, whether in appearance or in behavior. Accordingly, the prior art has several examples of fishing lures designed to imitate the appearance and behavior of live bait. As the minnow is a very commonly used bait, many prior art lures attempt to reproduce the appearance and behavior of the minnow.

One such prior art lure is described in U.S. Pat. No. 5,396,728 to Weber. Weber teaches a fishing lure shaped to resemble a minnow and to produce a wiggling motion when pulled through the water. The lure according to Weber is weighted in the head portion, such that as it settles, the lure orients itself with the head lower than the remainder of the body.

The use of weights in lures is also well known and allows for different lures to behave differently based on the distribution of the weights. An example of such a lure is described in U.S. Pat. No. 5,822,912 to Kato et al., and is made by providing two hollow guide sections within the body of the lure, in which spherical weights are allowed to move. This arrangement is meant to improve the distances achieved when casting, as well as placing the lure's center of gravity near the back end while in the water, thereby stabilizing the lure's movements.

However, none of the prior art fishing lures effectively imitate the behavior of a bait fish at rest. Weber, discussed above, does teach to place weights in the head portion such that, when at rest, the head is lower than the remainder of the body. Hence, Weber teaches how to achieve the proper orientation of a fishing lure at rest, but is silent on how to achieve the wobbling motion of the lure while it is not being pulled through water.

Accordingly, there is a need for a fishing lure which not only orients itself properly while at rest, but which also reproduces the multidirectional motion of a bait fish while at rest. Obviously, the term "at rest" as used herein means that the fishing lure is not being pulled through the water via the fishing line, and does not mean a completely motionless lure.

SUMMARY OF THE INVENTION

The present invention solves the above noted deficiencies of the prior art by providing a fishing lure with a center of balance aligned with a single contact point, wherein the fishing lure is adapted to contact the ground only at the single contact point. Typically, the contact point is positioned on the belly side of the fishing lure, if the lure is given the appearance of an actual bait fish.

According to one aspect of the present invention, there is provided a fishing lure comprising a body, wherein the body has a front end, a back end, a top side, and a bottom side, a hook, attached to said body, fishing line attachment means, attached to the body, a pedestal, attached to said bottom side of said body, wherein said pedestal terminates at its lowermost point into a single contact point; wherein said body is composed of a combination of buoyant and non-buoyant material, such that the lure's center of balance is aligned with said single contact point.

While the present invention may sometimes be described with references to minnows, the present invention is not so limited. In particular, the present invention may be adapted to imitate any kind of bait, be it a fish, crustacean, amphibian or any other animal, and references to minnows herein are only provided as examples.

DETAILED DESCRIPTION OF THE INVENTION

Figure 4:
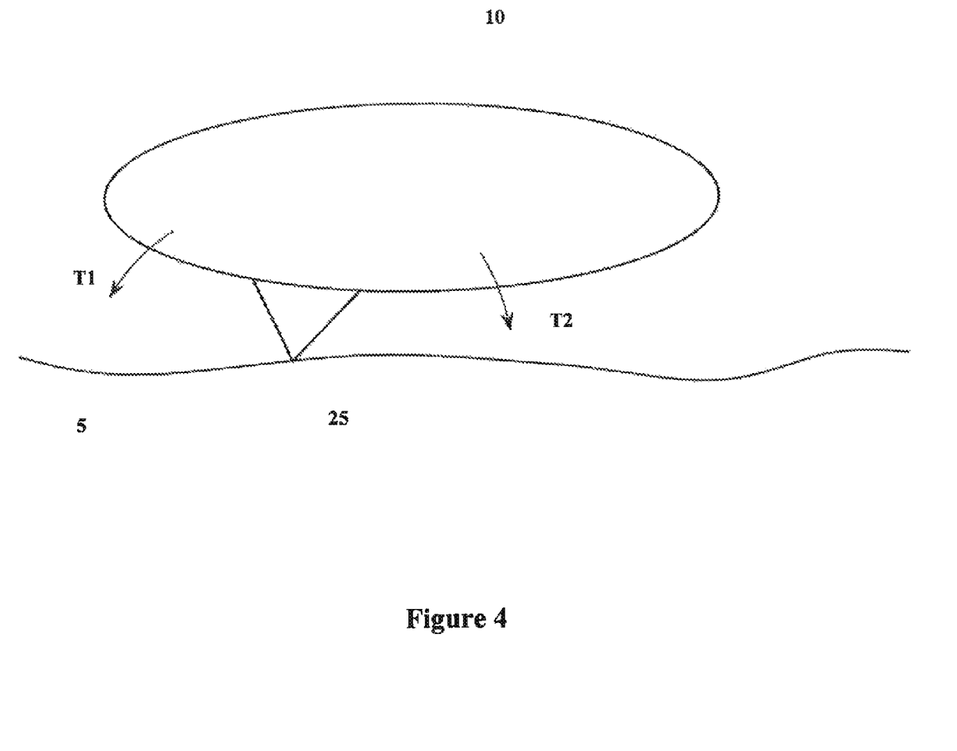
FIG. 4 is a side view of a cross-section of a depiction of the center of balance of the lure.

An important concept of the present invention is the "center of balance" of the lure. To the extent that the term "center of balance" requires clarification, it is hereby defined with reference to FIG. 4. A body 10 is in contact with a surface 5 at a point 25. Arrows T1 and T2 are representations of the torque which results from gravity, based on an axis of rotation at the contact point 25. Contact point 25 is aligned with the "center of balance" of body 10 when T1 is equal to T2.

Figure 1:
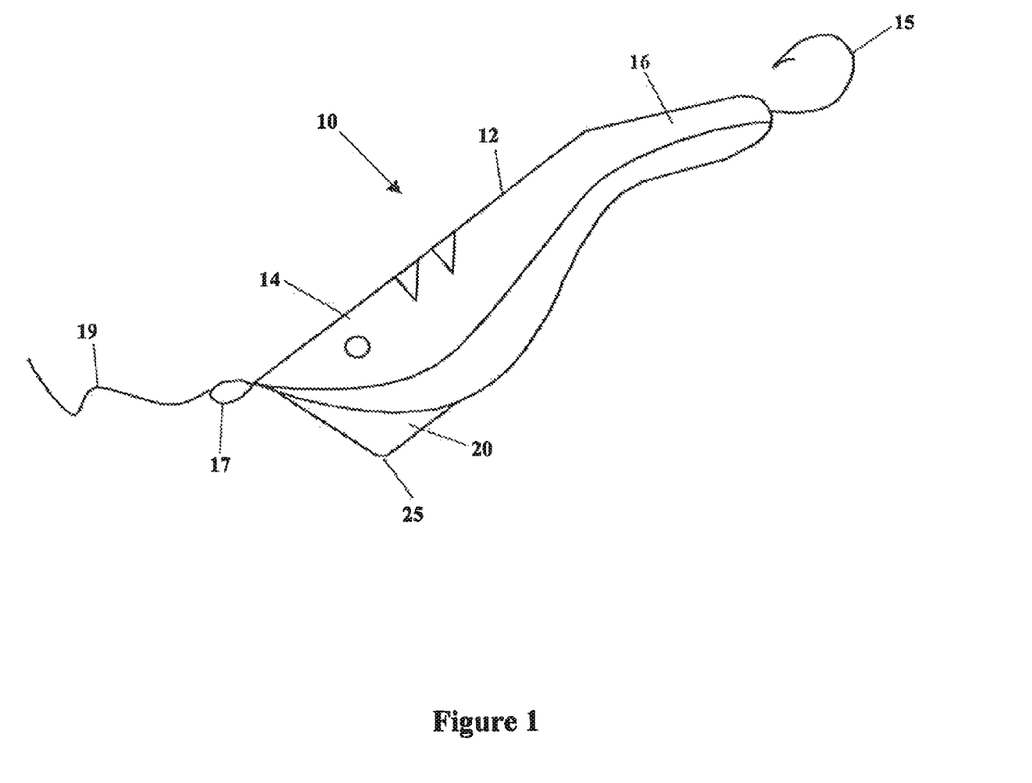
FIG. 1 is a side view of a fishing lure according to one embodiment of the present invention.

Reference is made to FIG. 1, wherein an exemplary embodiment of the present invention is shown. The lure, generally indicated by the numeral 10, has a body 12 comprising a head portion 14 and a tail portion 16. A hook 15 is preferably placed near the tail portion 16, and curving upwardly such that the tip points towards the head portion 14, although any hook arrangement known in the art is also considered within the scope of the present invention. The lure is also preferably equipped with a fishing line attachment means such as an eyelet 17 near the head portion 14, which allows the lure to be safely connected to a fishing line 19.

The lure 10 also has a pedestal 20, shown in FIG. 1 in the shape of an inversed pyramid, with a contact point 25. It will be appreciated that other shapes for the pedestal are also suitable, as long as the pedestal contacts the ground at a single point. As will be discussed in greater detail below, the lure's center of balance is lined up vertically with the contact point 25. This feature allows the lure to remain substantially at rest with only the contact point 25 touching the ground. In turn, this allows the naturally occurring turbulence in the water to impart multi-directional wobbling to the lure, with the contact point 25 effectively acting as a pivot point.

Figure 2:
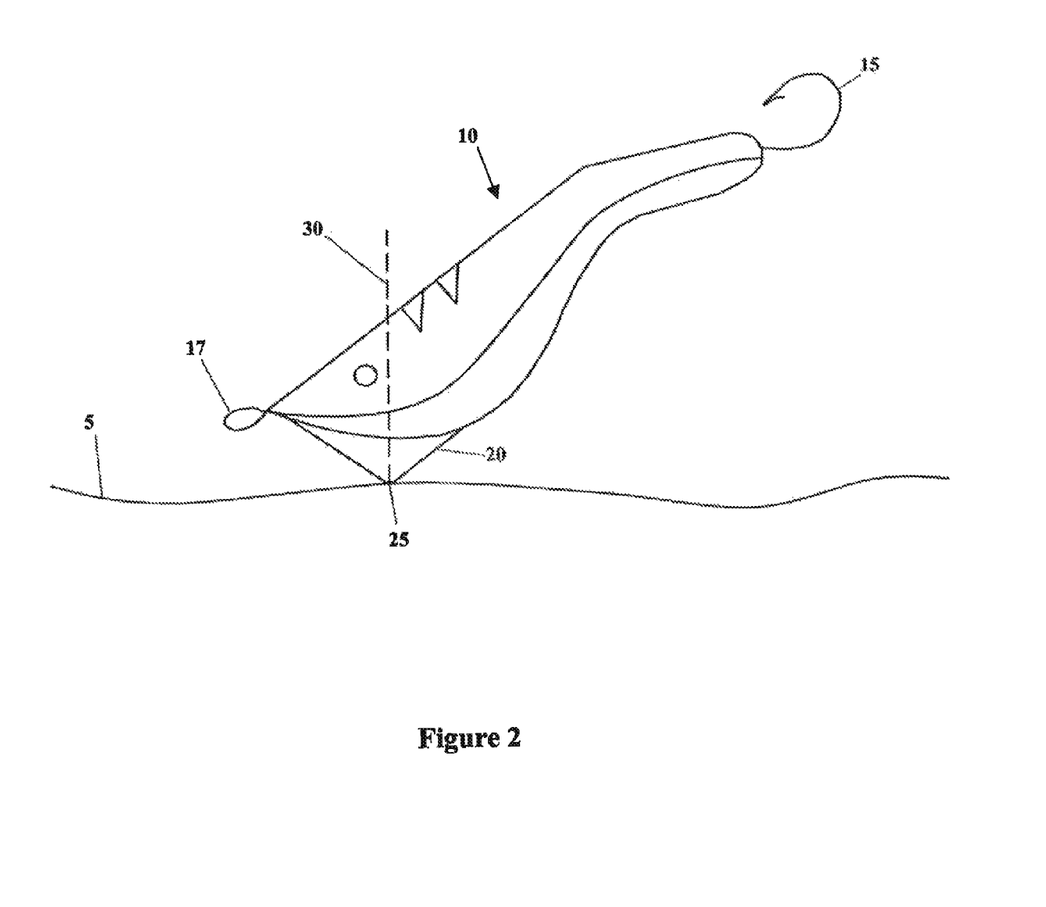
FIG. 2 is a side view of a fishing lure according to one embodiment of the present invention.

This is shown more clearly in FIG. 2, whereby the vertical axis of the lure's center of balance is identified by numeral 30. Also shown in FIG. 2 is the bottom surface 5.

To achieve the sought-after behavior, namely to have the fishing lure 10 stand in equilibrium on the bottom surface 5 with a single contact point, the single contact point must correspond to the lure's center of balance. In turn, in order to achieve a center of balance at a given position, a combination of buoyant and non-buoyant materials is used in the construction of the lure body 12 as will be described below in greater detail with reference to FIG. 3. According to one embodiment, the buoyant material is wood and the non-buoyant material is lead. However, other combination of materials known in the art may be suitable. As can be appreciated by a person skilled in the art, the different density of various materials greatly influences the proper distribution of buoyant and non-buoyant material required to achieve a proper center of balance. Nevertheless, a person skilled in the art may readily obtain a desired center of balance by trial and error, by mathematical modeling, or by determining a lure's center of balance experimentally and using that position as the lure's contact point.

Figure 3:
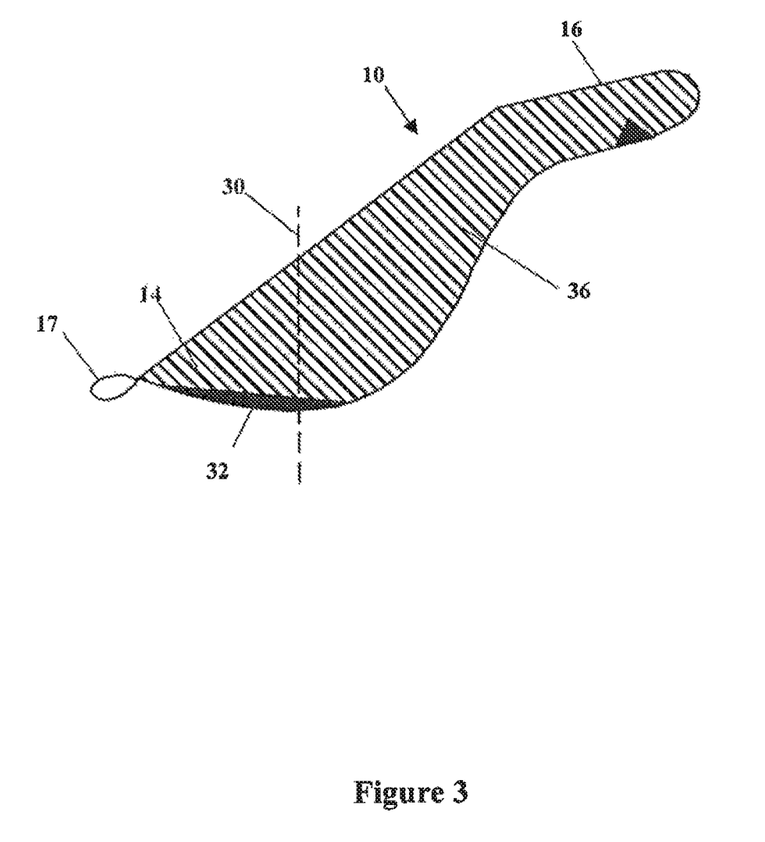
FIG. 3 is a side view of a cross-section of a fishing lure according to one embodiment of the present invention.

FIG. 3 shows the cross section of a lure 10, whereby the light sections 36 represent buoyant materials, and dark sections 32 and 34 represent non-buoyant materials or weights. As per the above, the distribution of buoyant and non-buoyant materials shown in FIG. 3 is merely provided as an example because any such distribution depends heavily on the relative density of the materials used, as well as the specific shape of the lure, and the present invention is not limited to any particular distribution.

As can be appreciated from FIG. 3 however, the weighted material is concentrated on the bottom side of the lure, making it bottom-heavy. This ensures that the lure does not go "belly-up" while in the water, and allows the slightest turbulence in the water to cause the lure to wobble as desired.

In a preferred embodiment, the lure is heavier near the head portion 14. This implies that the lure's center of balance is closer to the head portion 14 than the tail portion 16. This provides several advantages: firstly, by having a heavier head portion, the lure is generally oriented with the head lower than the tail, thereby more closely resembling a common behavior of a minnow as it feeds off a bottom surface; secondly, by having the center of balance closer to the head portion 14 than the tail portion 16, it increases the wobble action in the lighter tail portion 16, thereby more closely resembling the natural movement of a minnow's tail; and; thirdly, the heavier head portion 14 positions the lure at an angle on a bottom surface, thereby increasing its visibility to predatory fish.

In yet another preferred embodiment, the lure is head-heavy but nevertheless contains non-buoyant material in the tail portion 16. The presence of non-buoyant material in the tail 16 has the desirable effect of increasing the wobble in the lure as it rests on a bottom surface 5. This may require the head portion 16 to include additional weight so as to cancel out the effect of the non-buoyant material in the tail portion 14 on the lure's center of balance 30.

In operation, the lure may be dragged or jigged through the water as a conventional lure, but to take full advantage of this lure's innovative features, the lure must be allowed to rest on the bottom surface of whichever body of water it is being used in. As the lure 10 settles on the bottom surface 5, as seen in FIG. 2, the bottom-heavy nature of the lure ensures that it is properly oriented. When the pedestal 20 touches the bottom surface 5, the lure will have the tendency to remain balanced on the pedestal tip 25, as tip 25 is aligned with the lure's center of balance. From this semi-stable position, the lure 10 is wobbled by any turbulence in the surrounding waters, thereby imitating the behavior of a minnow at rest and enticing predatory fish to eat it.

FIGS. 5 to 10 illustrate another exemplary embodiment of a fishing lure and wherein like numerals have been used to identify like elements shown in FIGS. 1 to 4.

Figure 5:
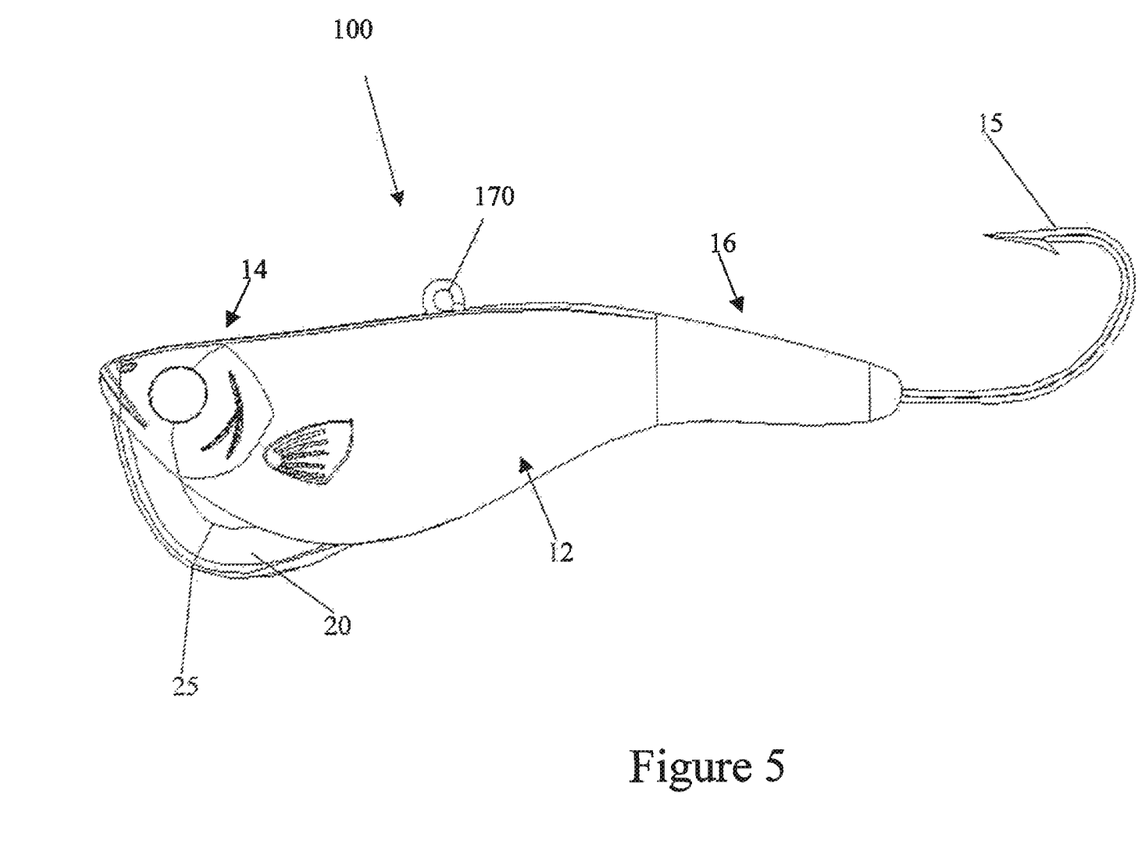
FIG. 5 is a side view of a fishing lure according to another embodiment of the present invention.
Figure 6:
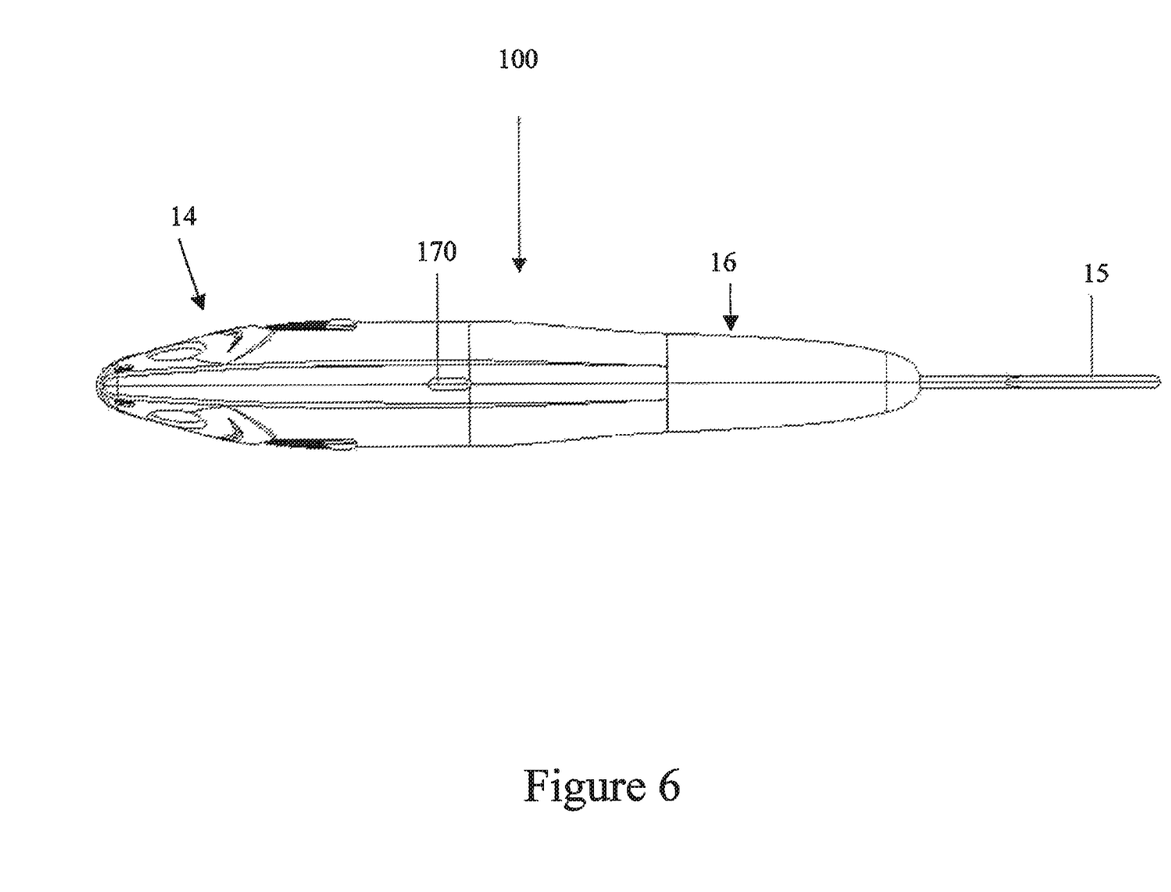
FIG. 6 is a top view of the lure shown in FIG. 5.

Reference is made to FIG. 5 showing a modified lure 100 in accordance with another exemplary embodiment of the present invention. As with the embodiment shown in FIG. 1, lure 100 has a body 12 comprising a head portion 14 and a tail portion 16. A hook portion is preferably placed near tail portion 16 and oriented as shown in FIG. 5. In this embodiment eyelet 170 is located more centrally along body 12's upper edge between the head portion 14 and tail portion 16 as can be seen in the top view of FIG. 6. By placing eyelet 170 more centrally along body 12's upper edge, lure 100 is more likely to remain in its proper orientation, as described in greater detail below, if the fishing line experiences movements, whether deliberate or not.

Figure 7:
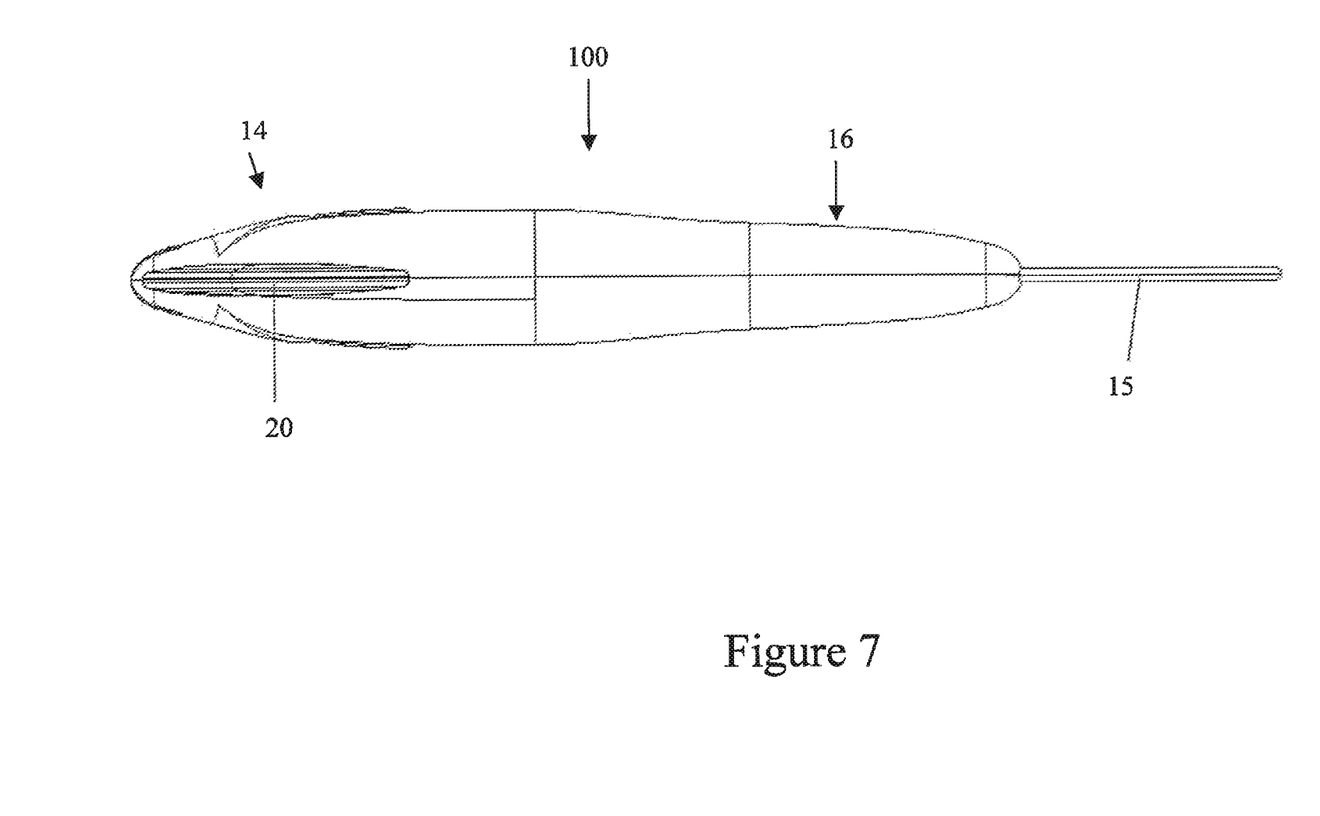
FIG. 7 is a bottom view of the lure shown in FIG. 5.
Figure 8:
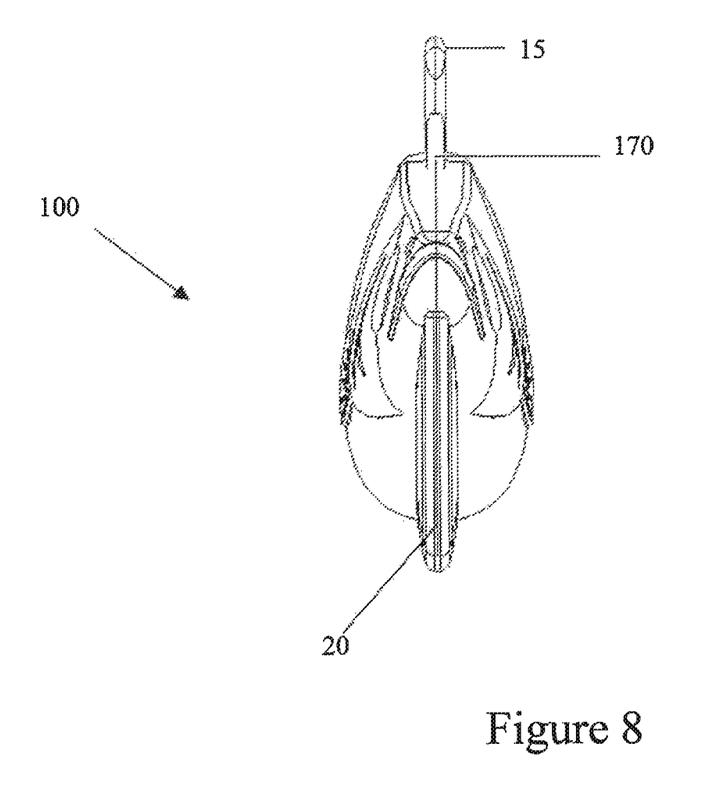
FIG. 8 is a front view of the lure shown in FIG. 5.

Lure 100, like lure 10, has a pedestal portion 20, shown in FIGS. 5, 7 and 8, in the shape of an inverted pyramid with a contact point 25 and again it will be appreciated that other shapes for the pedestal are suitable, as long as the pedestal contacts the ground at a single point. As discussed above, and as will be discussed in greater detail below, lure 100's center of balance is lined up vertically with contact point 25. This feature allows lure 100 to remain substantially at rest with only contact point 25 touching the ground. Consequently, this allows the natural turbulence in the water to impart multi-directional wobbling to lure 100, with contact point 25 effectively acting as a pivot point.

Figure 9:
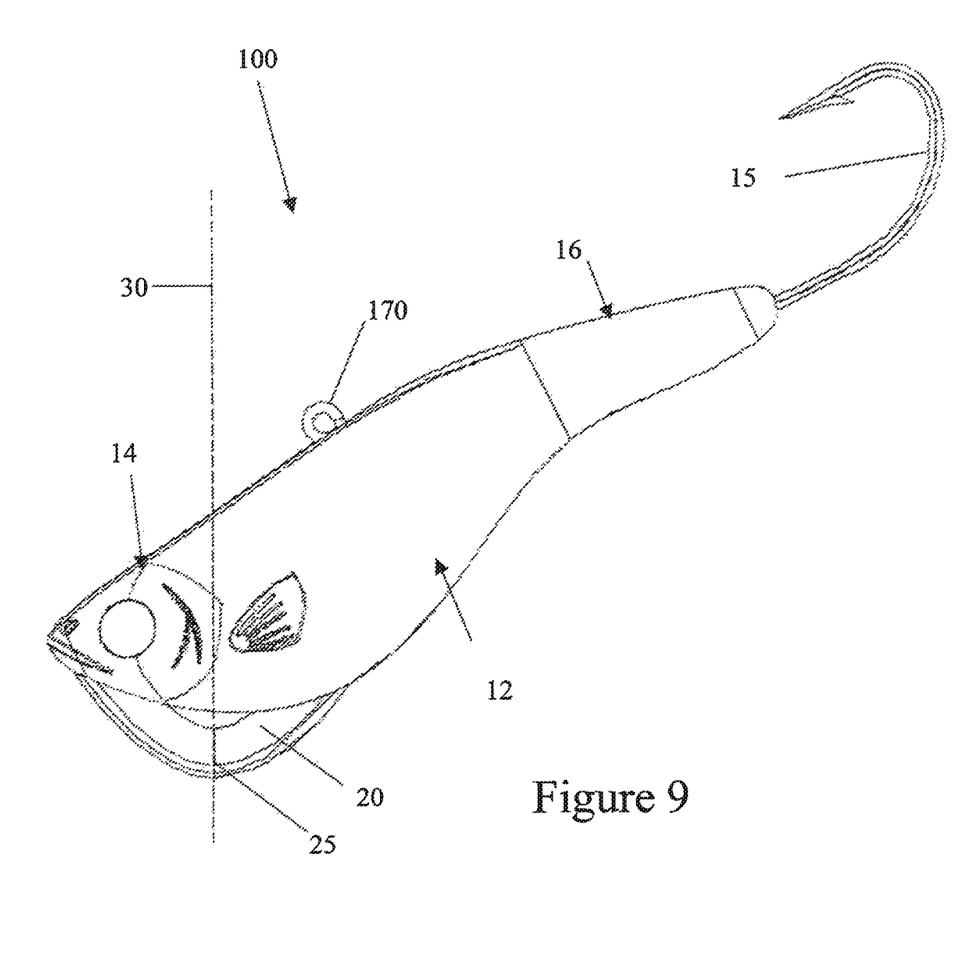
FIG. 9 is a side view of the fishing lure shown in FIG. 5.

This is shown more clearly in FIG. 9 whereby the vertical axis of lure 100's center of balance is identified by numeral 30.

To achieve the sought-after behavior, namely to have fishing lure 100 stand in equilibrium on the ground with a single contact point 25, single contact 25 must correspond to lure 100's center of balance. In turn, in order to achieve a center of balance at a given position, a combination of buoyant and non-buoyant materials is used, or, if lure 100 comprises all non-buoyant material, or not enough buoyant material a combination of non-buoyant materials and buoyancy means such as more of the buoyant material and/or one or more flotation means such as chambers in or about body 12 is used in the construction of lure body 12 as will be described below in greater detail with reference to FIG. 10. As with lure 10, the buoyant material can be wood and the non-buoyant material can be lead or some other weighted metal or substance. However, other combinations of materials known in the art may be suitable. For example, body 12 may comprise a non-buoyant resinous or plastic material. As will therefore be appreciated by a person skilled in the art, different densities of various materials, their buoyancy or lack thereof and, if all non-buoyant materials are used, the need for buoyancy from other means greatly influences the proper distribution of buoyant material, if any, non buoyant material and buoyancy means required to achieve a proper center of balance.

Figure 10:
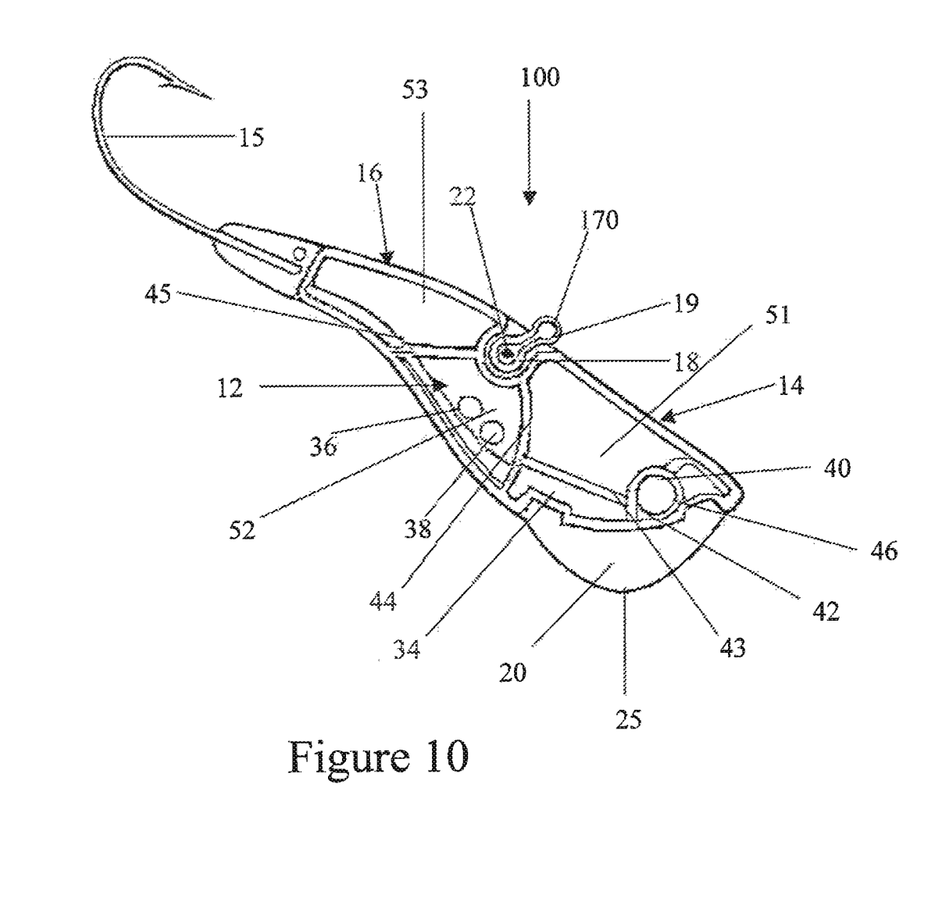
FIG. 10 is a side view of a cross section of the fishing lure shown in FIG. 5.

FIG. 10 shows the cross section of lure 100 with a generally hollow interior of body 12. Body 12 contains a non-buoyant material or weight 34, and non-buoyant weighted materials 36, 38 and 40. As per above, the distribution of weight 34 and weighted materials 36, 38 and 40 shown in FIG. 10 is merely provided as an example because the distribution depends heavily on the relative density of the materials used, the presence of buoyancy means, if any, as well as the specific shape of lure 100. The present invention is not limited to any particular distribution.

As can be appreciated from FIG. 10 however, weight 34, which is preferably the heaviest weight, is concentrated on the bottom side of lure 100, making lure 100 bottom-heavy.

This ensures that the lure does not go "belly-up" while in the water, and allows the slightest turbulence in the water to cause the lure to wobble as desired.

Weight 34 is preferably concentrated near the head portion 14. This implies that lure 100's center of balance 30 is closer to head portion 14 than tail portion 16. This provides the same multiple advantages mentioned above. First, by having a heavier head portion, the lure is generally orientated with the head lower than the tail, thereby more closely resembling a common behavior of a minnow or other bait as it feeds off the bottom. Second, by having the center of balance closer to head portion 14 than tail portion 16, it increases the wobble action in the tail portion 16, thereby more closely resembling the natural movement of a bait fish's tail. Third, the heavier head portion 14 positions lure 100 at an angle on a bottom surface, thereby increasing its visibility to predatory fish. Lastly, the angle of lure 100 increases the exposure of hook 15.

Weight 34 may be constructed from lead or any other metal, or weighted material as would be appreciated by a person skilled in the art. Weight 34 may be secured in place or may be capable of slight movement to increase the wobble of lure 100 so long as lure 100 maintains its desired orientation.

If lure 100 is comprised of all non-buoyant material, buoyancy must be provided by other means. With reference to FIG. 10 such other means can be flotation chambers 51, 52 and 53 inside body 12 defined by retaining walls 43, 44, 45. Chambers 51, 52, 53 may be gas filled, the gas being air for example, or they can be filled wholly or partially with a buoyant material such as a closed cell foam. The location, shape and size of floatation chambers 51, 52 and 53 shown in FIG. 10 is merely provided as an example because the distribution depends heavily on the relative density of the materials used, the presence and weight of weighted materials, if any, as well as the specific shape of lure 100. The present invention is not limited to any particular distribution.

As mentioned earlier, FIG. 10 shows the body 12 of lure 100 containing weighted materials 36, 38 and 40, which may be enclosed within chambers 52 and 42 defined by retaining walls 44 and 46 formed inside body 12. The presence of weighted materials 36, 38 and 40 may require weight 34 in head portion 14 to be heavier so as to cancel out the effect of the weighted materials on lure 100's center of balance.

The presence of weighted materials 36, 38 and 40 in body 12 can have the desirable effect of increasing the wobble in lure 100 as it rests on a bottom surface. If preferred some or all of weighted materials 36, 38 and 40 are free to move inside chambers 52 and 42. The movement of weighted materials 36, 38 and 40 might further increase the wobble of lure 100 as it rests on the bottom surface. The movement of weighted materials 36, 38 and 40 can also create a rattling sound by hitting or rolling against retaining walls 44 and 46 and body 12. The rattle may serve to attract fish.

Weighted materials 36, 38 and 40 may be steel balls or may be any other weighted material having any shape as would be appreciated by a person skilled in the art.

FIG. 10 also illustrates a preferred fishing line attachment means such as an eyelet 170. Eyelet 170 is generally oval in shape but compressed near the middle forming a first circle 18 and a second circle 19. First circle 18 may be secured to a pin 22 located in body 12. Second circle 19 extends out of body 12 and may be connected to a fishing line. The eyelet 170 may be attached to body 12 in a fixed position. The location of eyelet 170 allows lure 100 to be dragged across the bottom surface or jigged up and down while still maintaining or more closely maintaining its desired orientation, whether the dragging is deliberate or not. The same placement of eyelet 17 can be made with respect to the lure shown in FIGS. 1 to 4.

In a further embodiment, a weighted material may be located on the exterior of body 12. For example, in another embodiment of the present invention, the weighted material might be distributed in pedestal 20 or the pedestal itself may be comprised of a weighted material and therefore function as a weight to orient the lure at a preferred angle such as seen in FIGS. 2 and 9. While multiple embodiments of the present invention have been described above and illustrated in the accompanying drawings, it will be understood by a person skilled in the art that changes or modifications can be made thereto without departing from the essence of the invention. All such changes or modifications are believed to fall within the sphere and the scope of the invention as defined by the claims appended hereto.

What is claimed is:

1. A fishing lure, comprising:
   a body, wherein the body has a front end, a back end, a top side, and a bottom side;
   a hook, attached to said body;
   fishing line attachment means attached to said top side of said body near the center of said body;
   a pedestal, attached to said bottom side of said body, wherein said pedestal terminates at its lowermost point into a single ground engaging contact point;
   wherein said body is composed of a combination of buoyancy means and non-buoyant material, such that the lure's center of balance is aligned with said single contact point.

2. The fishing lure of claim 1 wherein said buoyancy means comprises one or more of buoyant material and flotation means.

3. The fishing lure of claim 1, wherein said lure is bottom-heavy.

4. The fishing lure of claim 1 wherein said lure is head-heavy.

5. The fishing lure of claim 1 wherein said body has the appearance of a small bait fish.

6. The fishing lure of claim 5, wherein said lure has the appearance of a crawfish.

7. The fishing lure of claim 2, wherein said flotation means comprises one or more flotation chambers in or about said body.

8. The fishing lure of claim 7, wherein said one or more flotation chambers contain on or more of a gas, closed cell foam and material that provides buoyancy.

9. The fishing lure of claim 1 further comprising a weight located near the front of said body.

10. The fishing lure of claim 9, wherein the fishing lure further comprises at least one weighted material located separate from said weight.

11. The fishing lure of claim 10, wherein said weighted material is located within a chamber in said body and is capable of moving within said chamber.

12. The fishing lure of claim 1 wherein said weight is metal.

13. The fishing lure of claim 1 wherein said body is symmetrical along its longitudinal axis.

14. The fishing lure of claim 8, wherein said weighted material is at least one metal ball.

15. The fishing lure of claim 1, wherein said body is comprised of a resinous material.

16. The fishing lure of claim 2, wherein said pedestal comprises said weight.

* * * * *